Oct. 21, 1930.                J. ERICKSON                1,778,938
                              ELECTRIC MOTOR
                        Original Filed Oct. 21, 1918
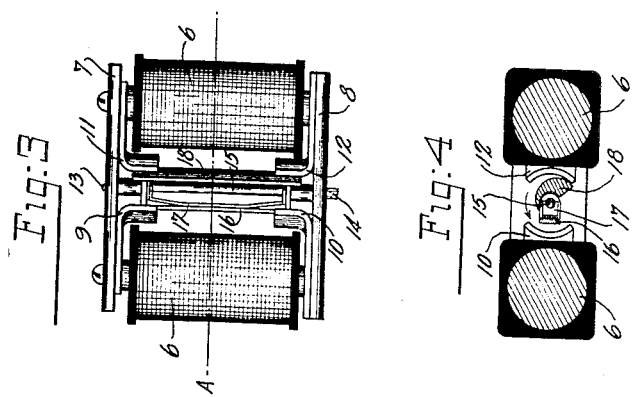
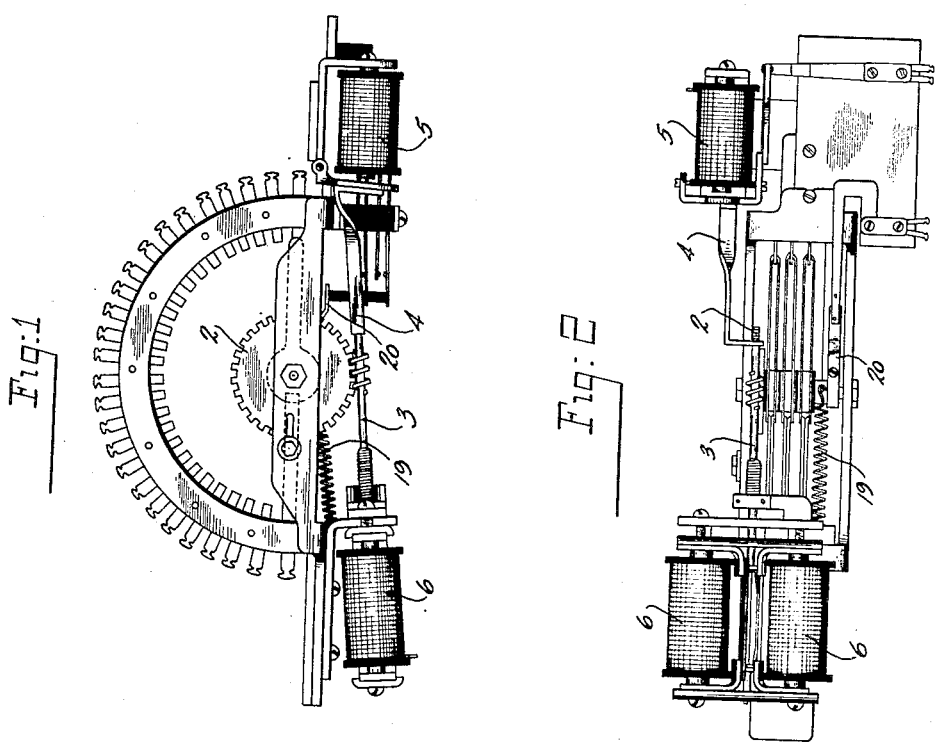
Inventor
John Erickson
Chas. M. Caudy, Atty.

Patented Oct. 21, 1930

1,778,938

UNITED STATES PATENT OFFICE

JOHN ERICKSON, OF CHICAGO, ILLINOIS, ASSIGNOR TO AUTOMATIC ELECTRIC, INC., OF CHICAGO, ILLINOIS, A CORPORATION OF DELAWARE

ELECTRIC MOTOR

Original application filed October 21, 1918, Serial No. 259,062. Divided and this application filed July 9, 1923. Serial No. 650,382.

The present invention relates in general to electric motors, but is particularly concerned with the design and construction of an electric motor of a type suitable for use in substitution for motors of the well known pawl and ratchet type, such for instance, as those used in various automatic telephone systems.

The object of the invention is to design a switch of this general type which is highly efficient, noiseless in its operation, and at the same time operates accurately and uniformly whether the current impulses for operating it are uniform in strength and speed or not. The noiseless operating feature of the motor of the present invention is a very desirable feature, while the other features are absolutely necessary- when the motor is to be used to operate switching mechanism of an automatic telephone system.

This application is a division of Patent No. 1,493,254 issued to John Erickson May 6, 1924, which covers various features such as the arrangements for operating holding and releasing the wiper mechanism, shown but not claimed in the present application.

Having described my invention in general I will now describe the operation of one embodiment of my invention as shown in the accompanying drawings, in which, Figure 1 is a plan view of an automatic switch operated in accordance with my invention.

Figure 2 is a front view of the apparatus shown in Fig. 1.

Figure 3 is an enlarged view showing the operating magnets and their special armature more clearly.

Figure 4 is a cross section along the line A—A, Figure 3.

Referring now to Figure 1, in order to simplify the explanation of the mechanism I have shown the same in connection with a simple one motion rotary switch such as might be used in an installation of a P. A. X. of from 25 to 50 lines. The type of switch shown is that having a plurality of wipers which rotate over a series of contact sets, one after the other, until a desired line is located and which are then released and returned to normal by means of a spiral spring. The leads or connections to the wipers consist of brushes which rub on the center portion of each wiper. In order to operate these wipers I provide a gear wheel 2, rigidly mounted on the shaft carrying the wipers and co-operating with a worm gear 3 which drives the gear wheel. This worm gear 3 is normally in mesh with the teeth of gear 2 and is pivoted at one end in the armature 4 of a release magnet 5 and at the other end has a flexible connection with the armature of a pair of operating magnets 6. Any rotary movement of the worm gear 3 drives the wipers forward toward another set of contacts.

The operating magnets 6 with their armature are shown more clearly in Figures 3 and 4. These magnets are mounted between a pair of brass brackets 7 and 8, each magnet having a pair of pole pieces 9 and 10 and 11 and 12, respectively, the inner ends of which are bent toward each other as shown. The armature of these two magnets is of peculiar design and is pivoted at points 13 and 14 in the brass plates 7 and 8. This armature consists of a shaft 15 having a brass piece 16 fastened to one side thereof by means of holes in its bent over ends, and into which the shaft 15 is inserted. A spring 17 is placed between the shaft and the brass piece 16 and operates as a clamp to hold the piece 16 in place. Firmly secured to the ends of the brass piece 16 is an iron part 18 which is so formed that one edge of its outer surface is very close to the pole pieces 11 and 12 or 9 and 10 when rotated, while its other edge is much farther away from the pole pieces, as shown in Figure 4. This whole armature being of a cylindrical shape, may revolve inside the curved pole pieces 9 and 11 at one end and 10 and 12 at the other end.

Now assume the armature to be resting as shown in Figs. 3 and 4 with the iron part 18 thereof close to the pole pieces 11 and 12. It will be seen that the thinner edge thereof is nearest to the left hand magnet 6. Now when the left hand magnet is energized the armature will be rotated in the direction of the arrow in Fig. 4. As the armature turns it will be seen that the thicker part of the part 18 gets nearer to the pole pieces so that the magnet always has something to pull against and will continue to draw the armature around a complete half turn until the part 18 stands with its thick edge flush against the upper or back edge of pole pieces 10 and 9, Figs. 3 and 4, so that the thin edge will now be closer to pole pieces 11 and 12 than the heavy edge. Then if the right hand magnet 6 be energized it will be seen that the armature will again be drawn about its axis in the direction of the arrow. The armature is therefore given one full turn by the energization of first one and then the other of its controlling magnets. The worm gear 3 and the gear wheel 2 are so related that one complete turn of the armature of the magnet 6 moves the wiper of the switch, through the worm and gear, one step onto the next set of contacts so that four impulses will send the wipers two steps, that is, four impulses delivered alternately to the operating magnets.

As the wipers are thus advanced by the worm 3, tension is stored up in the spiral spring 19 which winds around the wiper shaft. After the wipers have been rotated in this manner they may be released by the operation of the release magnet 5. This magnet 5, as explained, has an armature one end of which acts as a pivot for the worm 3. Now when magnet 5 is energized the worm 3 is carried away from the teeth of the gear 2 and the spring 19 acts on the shaft, to rotate the wipers back to normal position. An arm or normal post 20 is rigidly secured to the wiper shaft and controls the off normal springs. As the wipers advance this arm 20 leaves said springs and allows them to come into contact in pairs and again forces them apart when the wipers are released.

It will be seen therefore that I have provided a novel and efficient switch operating mechanism which is in the nature of a motor operated by impulses and having a pair of operating magnets operated alternating to rotate a shaft always in the same direction, to step a series of wipers step by step over a series of contacts. Also the gear which is used to rotate the wipers is used both as a holding and a release pawl. It will be understood that I have shown only one modification of my invention to illustrate the same and that other modifications in the method of control will readily suggest themselves to those skilled in the art and come under the scope of my invention.

Having fully described and ascertained the features and aspects of my invention, what I consider to be new and desire to have protected by Letters Patent will be pointed out in the appended claims.

What I claim as my invention is:

1. In an electric motor, a rotatable shaft, two double pole magnets, one on each side of said shaft, the poles of each magnet being on a line parallel to the shaft and each pole having a curved inner surface covering an arc of approximately 90°, and an armature mounted on and located substantially all on one side of said shaft, extending substantially from one pair of opposed poles to the other and adapted to shorten the gaps between the poles of said magnets successively as the shaft is rotated.

2. In an electric motor, a rotatable shaft, two double pole magnets, one on each side of said shaft, the poles of each magnet being on a line parallel to the shaft and each pole having a curved inner surface covering an arc of approximately 90°, and an armature eccentrically mounted on said shaft and having its surface shaped substantially like a half cylinder of a diameter substantially less than the distance between opposite pole pieces.

In witness whereof, I hereunto subscribe my name this 7th day of July, A. D. 1923.

JOHN ERICKSON.